Sept. 15, 1942.  L. R. BOGARDUS  2,295,825
DISTRIBUTION SYSTEM FOR ELECTRICITY
Filed July 18, 1939   2 Sheets-Sheet 1
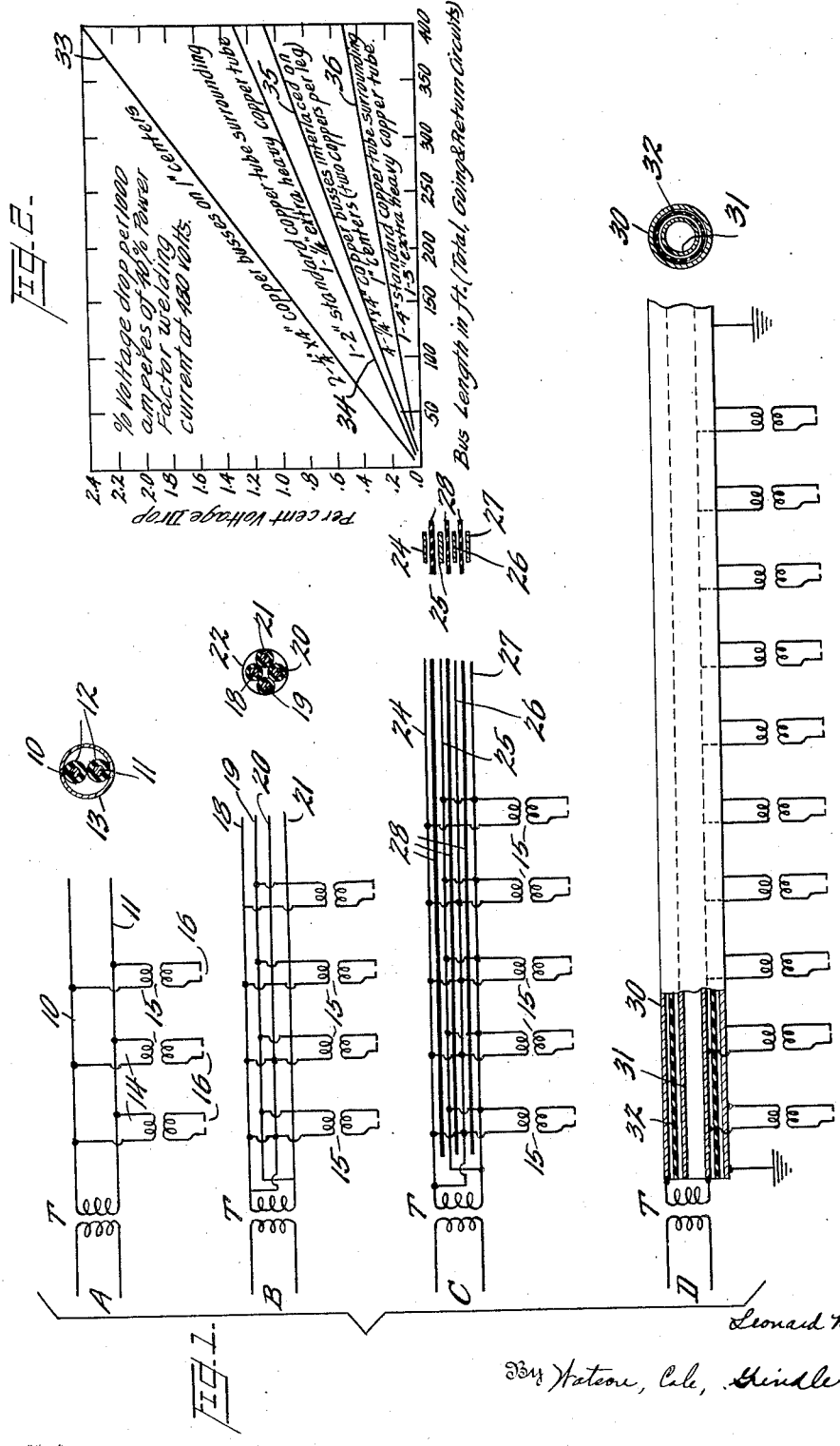

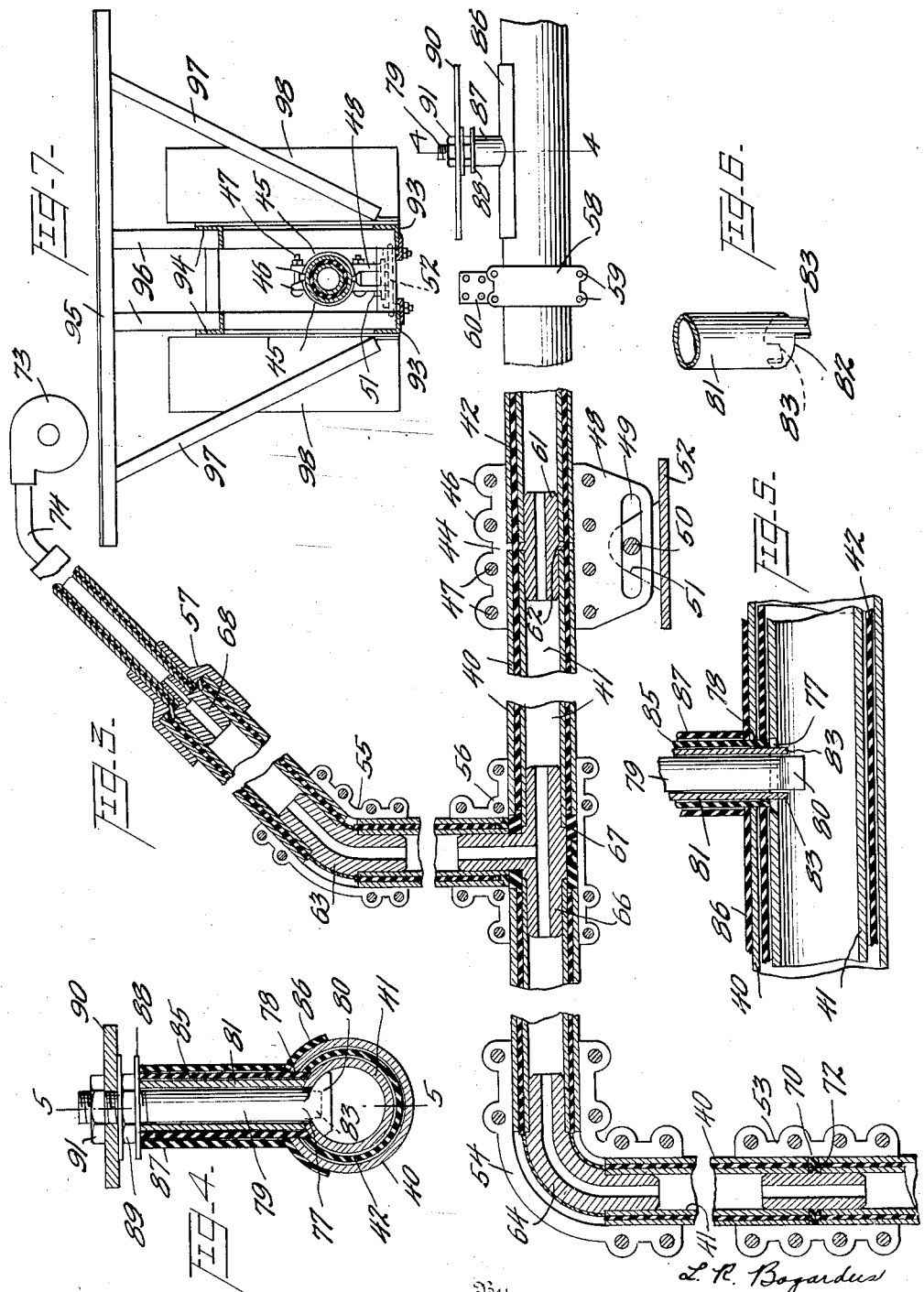

Patented Sept. 15, 1942

2,295,825

UNITED STATES PATENT OFFICE 2,295,825

DISTRIBUTION SYSTEM FOR ELECTRICITY

Leonard R. Bogardus, Detroit, Mich., assignor to Packard Motor Car Company, Detroit, Mich., a corporation of Michigan Application July 18, 1939, Serial No. 285,204

8 Claims. (Cl. 174—15)

This invention relates to distribution systems for electricity and more particularly to improved bus systems for high current, single-phase, inductive loads such as resistance welding equipment, induction furnaces, and the like.

It is the general object of the present invention to provide an electrical distribution system capable of delivering greater loads for longer distances with less voltage drops than with systems heretofore used and having a comparable amount of metal.

It is a further object of the present invention to provide a simple, self-contained bus system in which one of the conductors is permanently grounded throughout its length and provides complete protection for the ungrounded conductor, the whole being arranged to provide a minimum of inductive reactance when used with high current loads and single-phase industrial frequencies.

Another important object of the invention consists in the arrangement of busses in pairs for the complete supply of single-phase alternating current to large inductive loads wherein the two busses of a pair are coaxially disposed metal tubes of similar cross-sectional area, each having a diameter to thickness ratio greater than 10 and being spaced apart radially less than the requisite distance necessary for air insulation at the working voltage.

An important feature of the novel bus system comprises simple and effective means for taking taps from the inner tubular conductor whereby welding equipment may be spaced at any desired intervals along the bus and readily adjusted in position at any time in accordance with the requirements of the work being done. This feature is disclosed and claimed in application Serial No. 439,593, filed April 18, 1942, as a division of the instant application.

Another important feature of the invention comprises the combination of coaxial busses having the outer conductor grounded whereby it may be directly supported from a structural steel framework of such a nature as to provide adequate mountings for both the welding transformers and the boxed control equipment for the same.

Other and further features and objects of the invention, and particularly details of construction, will be more apparent to those skilled in the art upon a consideration of the accompanying drawings and following specification wherein is disclosed a single exemplary embodiment of the invention with the understanding that such combinations of parts shown, variations thereof and modifications of the system and elements may be made as fall within the scope of the appended claims without departing from the spirit of the invention.

In said drawings:

Figure 1A is a diagrammatic representation of an early form of bus system used for welding;

Figure 1B is an improved form using four cables;

Figure 1C is a further improvement using interlaced flat bus straps;

Figure 1D represents wholly diagrammatically the tubular bus system of the present invention, the various diagrammatic showings illustrating by their respective lengths and connected loads the approximate capacities and carrying distances of the systems wherein each uses a somewhat similar quantity of copper and produces a voltage drop at the end of the line not greater than a predetermined maximum above which it is not possible to obtain good quality welding;

Figure 2 is a chart or graph illustrating voltage drops at various lengths of bus of several different types, comparing them with the system constructed in accordance with the present invention;

Figure 3 is a longitudinal central section through and partial elevation of a bus system constructed according to the present invention showing various types of fittings;

Figure 4 is a transverse section on line 4—4 of Figure 3 showing a tap construction;

Figure 5 is a section on line 5—5 of Figure 4;

Figure 6 is a perspective view of a tap part; and

Figure 7 is a cross-section of a bus showing the structural mounting parts and their additional functions.

The problem of adequately supplying the very large loads to electric resistance welders, induction furnaces, and other very heavy single-phase, low power-factored loads has not hitherto met with an entirely satisfactory solution because the feeders supplying the current must be able to meet unusual requirements. For the sake of simplicity the problems of resistance welding loads will be considered herein as an adequate example of various types of load to which the present invention is applicable. Such welding loads, particularly in production plants, as those fabricating automobile bodies, are very different from the ordinary light and power loads. Their characteristics of low power-factor, short time and very high currents, the requirement for using single-phase, and the desire for excellent regulation necessitate a different arrangement of conductors than has heretofore been used. The use of conventional motor wiring methods has been found entirely unsuited.

As previously stated, regulation is one of the major problems but conductor heating is not a serious factor in circuit design for welders, for while the current demands are extremely heavy they are also very brief so that I²R losses do not build up excessive heat. For example, the more or less conventional gun welders using approximately 50 kva. finish a single spot welding operation in from three to six cycles of the usual commercial frequency currents. The power factor, however, is only approximately 40% and the large increased current thus necessitated produces high resistance and reactance voltage drops if the conductors are of any considerable length.

It is conventional practice to provide circuits of short length between the main supply transformer and the actual welding loads and to maintain the conductors of this circuit as close together as possible.

The earliest practice made use of a pair of heavy feeder cables in a conduit but this soon exhibited marked disadvantages both in electrical characteristics and in the difficulty of making taps when welder positions were to be changed or new ones added. In certain production work the welding equipment is distributed every few feet along the feeder lines and must be changed in position from time to time as changes in production require. The conductors from the feeders to the welding transformers and from these transformers to the guns must be kept at a minimum length so that new taps are imperative when equipment is to be moved even a very few feet.

Following this arrangement it became quite universal to use four or more feeder cables just taped together so that tapping for welder supply was not so much of a problem but still relatively difficult. The use of a plurality of cables resulted in a better interlinkage of magnetic fields and thus reduced the inductive reactance to some extent, but still the combined resistance and reactance drops were such that all welders had to be kept within one or two hundred feet of the main supply transformer and only a limited number could be distributed along the feeder system.

Following the wide use of the taped cables came the use of interlaced bus bars. This system makes use of rectangular strips or bars of copper of large cross-section separated by suitable insulation strips. Usually four, eight or more bars were used with adjacent bars on opposite circuit legs to improve the inductive reactance. The tapping difficulty was not materially reduced by this construction and such bus bar equipment became exceedingly heavy and cumbersome because portions of the bars were exposed and required a conduit or duct system or some form of housing which protected them from chance short circuits and at the same time permitted access for tapping.

In accordance with the present invention an extremely simplified distribution system has been worked out in which but two conductors are used, each a large diameter copper tube, coaxially disposed, closely adjacent to each other, and separated by a thin-walled, preformed, rigid, insulating tube. With this construction the reactance was immediately reduced to a point where it is slightly less than the ohmic resistance and contrary to expectations it was found that although using considerably less copper than the comparable interlaced bus system, more welders could be used and the distance to which current is conducted to them could be substantially doubled while at the same time maintaining better regulation than had been experienced with the interlaced bus system.

Figure 1 of the drawings represents diagrammatically the four systems described briefly above and in each case T is the main power transformer connecting the feeder system to any suitable source of single-phase alternating current. Such current is usually supplied at 60 cycles and around 4800 volts and in most cases is reduced by the transformer T to approximately 480 volts which is satisfactory for application to the primaries of the welding transformers. In Figure 1A the two conductors 10 and 11 are suitably insulated as shown at 12 and are arranged in a metal conduit 13. Taps 14 are taken off to the primaries of the welding machine transformers 15, the secondaries of which feed the welding tools or guns 16. This arrangement of conductors, as previously stated, has high inductive reactance, low current capacity within voltage drop limits, and is difficult to adapt to changing welder positions.

In Figure 1B the four conductors 18, 19, 20 and 21 are connected in pairs, 18 and 20 being connected to one side of the secondary of the transformer T and 19 and 21 to the other side. Likewise these conductors are tapped in pairs to feed the welding transformers 15. The conductors are conveniently held together by tape wrappings at suitable intervals as shown at 22. This system partially because of the greater quantity of copper but mainly because of reduced reactance due to the better interlinkage of magnetic fields can be used for conducting somewhat higher currents to greater distances as diagrammatically illustrated on the drawings.

In Figure 1C the four conductors 24, 25, 26 and 27 are respectively flat copper straps or bars of relatively large size, say about ¼" x 4" in cross-section and are suitably spaced apart by the insulating plates 28. Alternate bars are connected to one side of the transformer secondary and the remaining ones to the other side, thereby improving the flux interlinkage. In a like manner the welding transformers 15 are connected to the two bus bars on each side of the circuit. The number of bus bars can be increased to augment the capacity as required, but the problem of properly supporting, encasing, and insulating the large copper bars from each other and from their supports and surrounding equipment and protecting them against short circuit is such that this arrangement of elements is extremely costly. It does, however, produce results superior to the systems described before as illustrated diagrammatically by the increased number of welders attached and the greater distance to which the current is conducted.

The system of the present invention is crudely illustrated diagrammatically in Figure 1D, where the coaxial copper tubes 30 and 31 are mechanically and electrically separated by the insulation tube 32 arranged between them. The bare outer tube 30 is grounded at the transformer T and at every support position and is mounted by being directly clamped or bolted to metal supports which may be a portion of the building framework, ensuring grounding throughout the length of the bus. This outer conductor is therefore a mechanical and electrical protection to the high voltage inner conductor 31 which is adequately insulated from the same by the single insulating tube. No protective casings or ducts are necessary so that in addition to its improved electrical characteristics the system is cheaper to install and operate. Taps can be made directly to the outer tube by means of clamps, and by a relatively simple arrangement, which will be later described, convenient taps are made at frequent intervals to the inner conductor. Appropriate openings can be arranged in both conductors at very close intervals and the taps applied at any time required.

The improved electrical characteristics resulting from the present construction as compared with prior devices is best illustrated in Figure 2 where ordinates represent voltage drop in percentage of the whole applied voltage from the transformer T, while abscissae indicate feeder lengths in feet including both the going and return circuits. The sloping line 33 illustrates a substantially 2.4% drop in voltage at a distance of 400 feet with two ¼" x 4" copper bars spaced on one inch centers, while sloping line 34 shows a drop of less than 1.3% for a co-axial bus comprising a 2" copper tube surrounding a 1¼" copper tube, the outer one being of standard pipe size and the inner one of extra heavy pipe size.

When four ¼" x 4" copper bars are used with two per leg of the circuit, the voltage drop at 400 feet is approximately 1.1% as shown in sloping line 35, all slopes on the chart being based on a current flow of 1000 amperes at 480 volts and 40% power factor.

The much improved condition resulting from using a coaxial bus of one 4" standard copper tube surrounding one 3" extra heavy copper tube is illustrated in sloping line 36 where the voltage drop is reduced to approximately .5% at 400 feet.

To better illustrate the improved results accomplished by use of the coaxial tubes according to the present invention, a comparison may be made between the use of eight ¼" x 4" interlaced bus bars, four per leg, having a total cross-section of 8 square inches of copper as against one copper tube having 3½" outside diameter and 3.062" inside diameter and one inner copper tube having 2.750" outside diameter and 2.125" inside diameter, making a total cross-section for both tubes of 4.650 square inches or approximately 58.3% of that of the bus bars. The total weight of copper in the coaxial bus is eighteen pounds per linear foot as against thirty; the carrying capacity at 30° C. for normal operation, 2414 amperes as against 2760 being better than 88%, the cost for the coaxial bus being $9.40 per foot as against $17 per foot for the interlaced bus bar. At 500 feet distance from the power transformer the drop at the two currents previously mentioned is respectively 3.22 volts for the coaxial and 6.39 volts for the interlaced bus bars, almost twice as much with less than one-seventh more carrying capacity.

In actual operation an installation in which the outer tube is approximately 4" inside diameter, standard iron pipe size, and the inner tube 3" inside diameter, extra heavy standard iron pipe size, it has been found that the operation permits carrying the current more than twice as far, the operation of almost twice as many welders with less voltage drop at the end of a 600 foot run than was previously produced with an interlaced bus system of eight bars ¼" x 4" each at a distance of only 200 feet. This has materially reduced the troubles of the power company for now they find that at the sub-station the allowable 3 volt flicker value is not exceeded even though the load swings as much as 1500 kva. on the busses.

The practical embodiments of the present invention may take many forms and for the purpose of illustrating the invention there is shown in Figures 3 to 7 inclusive a combination of parts which has been found extremely satisfactory for supplying current to a production welding job where welders of various sizes, types, and uses are very closely arranged throughout the full length of a 600 foot coaxial bus.

The bus system itself comprises a seamless, drawn copper outer tube 40 of standard 4 inch iron-pipe size, and an inner or nested tubular member 41 of 3 inch extra heavy iron-pipe size; this latter providing a close approximation of the cross-sectional area of the outer tube and providing for such a metal distribution as to obtain substantially the maximum usage thereof, the respective areas in circular mils being 4,040,000 and 3,835,000. The diameter to wall thickness ratio of each of these tubes is greater than 10 and the spacing of the two is as close as possible to keep the inductance low. The provided spacing between the outer surface of the inner tube and the inner surface of the outer tube is less than that essential for air insulation at the 480 volts used. To mechanically and electrically separate the tubes and support the inner from the outer, a close fitting insulation tube 42 is provided, preferably of some molded and reinforced plastic such as Micarta. The sections of conducting and insulating tubing can be readily put together by sliding or telescoping one within the other, the fits being such as to permit this, which contributes materially to the ease of field assembly.

The outer tube is grounded at frequent intervals and its outer surface is bare. It can be supported in any convenient manner and since it is at ground potential no costly insulators are required. Any conventional form of pipe clamp may be used. The copper tubing, because of its size, is quite heavy and it is found convenient to use it in lengths of 12–15 feet. The joints may be staggered between the inner and outer metal tubes or they can be made at the same place with no difficulty as shown. Joints in the insulation tube are preferably simple overlaps formed by counterboring the end of one and reducing the outside diameter of the other until they can be telescoped with sufficient friction to retain them in position.

In Figure 3 at 44 is shown a clamp performing the dual function of mechanically and electrically securing together the substantially abutting ends of two sections of the outer tube and of providing a support for the same from any structural element available. The clamp comprises two substantially semi-circular parts 45 as seen in Figure 7 provided with the upper flanges 46 perforated to receive clamp bolts 47 and the lower perforated flanges 48 likewise provided with bolts and extending downwardly and slotted at 49 to be slidably supported on a pin 50 spanning the ears 51 on the base 52 arranged to be mounted on any suitable support. At 53 is shown a similar clamp without the mounting portion, its sole purpose being to attach the two pipe sections together. A clamp similarly designed but providing an elbow of 90° is shown at 54 from which its construction will be obvious. Likewise a 45° L-clamp is shown at 55 and a T-clamp at 56. For reducing the diameter of the bus for extensions carrying lighter loads, resort may be had to a suitable press or sweat-fitted reducer coupling 57.

Electrical connections to the outer pipe or tube are made by means of a simple strap clamp 58 made of suitably heavy copper to carry the required current. Clamping bolts are passed through the ears 59 thereon and a lug 60 is provided with four openings to receive bolts for attaching terminal lugs on welder cables. Obviously the connector straps may be applied anywhere that it is convenient on any unoccupied space on the surface of the bus. It will be noticed that all outside fittings engage the outer surface only of the bus sections and have no portions extending within the cylinder defined by the outer surface of the outer tube.

The inner tube 41 has its sections joined together by appropriate fittings whose outer surfaces engage the inner surfaces of the tube sections and no part of which extends beyond the outer surface of the inner tubes, except in a few special cases. For a simple butt joint there is shown at 61 a longitudinally perforated nipple having the circumferential flange 62 of an overall diameter the same as the outside diameter of the inner tube. The tube ends are fitted over the nipple and abut the flange. It has been found that current conductivity is best if a shrink-fit combined with solder sweating is used at these inner joints. It is obvious that 45° and 90° elbows such as shown at 63 and 64 may be readily provided, the flange being extended to fill out the space between the ends of the straight tube sections. At such elbows it is convenient to taper off the ends of the insulation tubes and to join them and cover the enlarged portion of the inner fitting with suitable cambric tape insulated with a proper impregnant as is customary. This can be done before applying the outer tube sections and their clamp parts.

At 66 is shown an inner T-fitting and here appropriate insulation bushings 67 are provided separated on such lines as necessary to permit them to be fitted over the T portion. The manner of carrying out this insulation forms no especial part of the present invention and it is only essential that a sufficient distance of overlap be ensured so that no breakdown through the joint is possible. The internal element 68 of the reducing fitting is obvious from the drawings.

Where vertical runs are of any considerable length, it is advisable to make provision to support the inner tube and the insulating tube from the outer tube and this is done as shown at 70 by providing a suitable annulus of insulation received between the ends of the outer tubes where they are clamped together. Grooves 72 are provided therein for the abutting ends of the insulation tubes and another groove accommodates the flange on the inner fitting and thus supports it as well as its tube sections from the outer tube sections which may be clamped at appropriate intervals to structural members.

It will be noted that all of the inner fittings are hollow, providing a continuous duct through which cooling fluid such as air or the like may be delivered directly in contact with the walls of the inner tube by means of a fan 73 connected to any one of the inner tube sections by an appropriate insulating hose 74. To date, even with very heavy loads, no cooling has been found necessary but if it is desired to increase the load on the busses this method of cooling will be effective. The outer tube being exposed and entirely open will cool sufficiently by radiation.

One of the important features of the present invention is the ease with which taps can be taken from the tubular conductors. The outer tap has already been described and reference should be had to Figures 3 to 6 inclusive for the manner of effecting a tap to the inner tube.

Each inner tube is provided, wherever a tap may be required, with a rectangular slot 77 as seen in Figures 4 and 5, the long axis extending longitudinally of the tube. The insulation tube and the outer tube are drilled with circular apertures 78 having a diameter substantially equivalent to the maximum length of the rectangular slot in the inner metal tube.

The actual connecting member is a T-headed copper bolt having a cylindrical shank 79 and the head 80 curved on its undersurface to the same radius as the inner wall of the inner tube. This head may be passed through the openings in the outer and insulation tubes, and by proper orientation through the slot in the inner tube which is sloped and sized like the head. It may then be rotated 90° about the axis of the shank to the position shown in Figures 4 and 5 whereby the curved under-surface of the head beyond the shank will closely fit and contact with the inner wall of the inner tube. Next a copper sleeve 81, best shown in Figure 6, is slid over the shank of the bolt. This sleeve has its lower edge 82 curved to fit the outer surface of the inner tube 41 as shown in Figure 4. Extending from this edge are the two lugs 83 each having a transverse width the same as that of the narrow dimension of the slot 77 and a length at least that of the wall thickness of tube 41. These projections extend down beside the head 80 as seen in Figure 5, and fit into the slot, closely engaging the walls thereof to prevent rotation of the sleeve in the tube and also to prevent rotation of the T-headed bolt.

With the bolt and sleeve in position they are covered by an insulation tube 85, the lower end of which is curved to fit the outer surface of the inner conducting tube. The outside diameter of this insulation is such as to closely fit through the openings in the main insulation tube and the outer conducting tube. Over this tube 85 is closely fitted the opening of a shield 86 whose inner surface is curved to fit the outer surface of the outer tube. To retain this shield in position a second insulation sleeve 87 closely fits over the tube 85 and has its lower end arranged to bear on the shield and hold it in position. The upper ends of the copper sleeve 81 and the insulation tubes 85 and 87 are cut off at right angles and in alignment, and bearing on their outer ends is the metal washer 88 held in position by the lock nut 89 which presses downwardly on the copper sleeve 81 and draws upwardly on the shank of the bolt to which it is threaded and tightly clamps the wall of the inner conductor tube between the lower end of the sleeve and the upper face of the bolt head, providing excellent electrical contact and mechanical connection.

Current is taken off from the bolt by attaching thereto a bus plate 90 by means of a second nut 91. This plate may be conveniently perforated with two holes on each side of the bolt to receive small bolts for clamping the terminal lugs of welding cables thereto.

Preferably the inner terminals or taps, just described, are spaced close to the outer tube terminal straps as shown at the right in Figure 3 and where a number of welding devices are used in production work which requires frequent changes in their positions, it is convenient to apply terminals at say six foot intervals. It may sometimes be desirable to provide for future needs by providing the apertures for inner terminals and covering these with suitable insulation so that the positions are available for inserting the terminals when required.

An added feature of the present invention is the adaptability of the bus system to simple mounting and the possibility of using the mounting for carrying other welding equipment. Referring now to Figure 7, it will be seen that the base 52 of the bus clamp and support is bolted to the lower members of longitudinal angle bars 93 spaced apart as shown and arranged directly below similar bars 94 to which they are attached at intervals and also to members 95 secured to the structural portions of the building by short vertical suspension members 96. Appropriate diagonal braces 97 serve to prevent swaying and help carry the load. The spacing between members 94 and 93 may be such as to accommodate any required number of busses either in their usable sections or in portions such as risers or the like where no connections are made.

Welding equipment of the type referred to previously may include relatively large transformers which may be suspended from the structural framework just described. In addition each welder is conventionally equipped with a circuit breaker, a contactor and/or a timer mechanism and each of these devices is enclosed in a suitable sheet metal box such as shown at 98 in Figure 7. The horizontal frame members 93 and 94 provide excellent support for such boxes and where the welders are closely spaced, it may be necessary to support the boxes on both sides of the framework as shown.

The racks for the busses may also carry trolley busses of low voltage from which taps can be conveniently taken to effect operation of control apparatus.

Having thus described the invention, what is claimed as new and desired to be secured by Letters Patent is:

1. A bus system for supplying single phase alternating current to a load requiring high current at moderate frequency and with minimum voltage drop, comprising in combination, rigid, coaxial, tubular solid material conductors, one of which has such metal distribution as to provide substantially maximum usage of the metal at the said frequency, the other conductor having substantially the same current carrying capacity, the confronting walls of said conductors being radially spaced from each other a distance just sufficient to accommodate the required insulation to provide safety at the operating voltage desired, said insulation comprising rigid self-supporting tubular sections at least as long as the conductors and fitting sufficiently loosely between the same to permit field assembly.

2. The bus system as described in claim 1 in which the outer tube is bare, including means to deliver a cooling fluid through and directly in contact with the wall of the inner tube.

3. A pair of coaxially arranged busses for connection to a single phase circuit to conduct heavy current at commercial frequencies, each bus comprising a rigid, self-supporting, metal tube having a diameter to wall thickness ratio of at least 10, said tubes being too closely spaced to each other for air insulation at the voltage used, said tubes having substantially the same cross-sectional area and each comprising a plurality of longitudinal sections, the sections of the inner tube being all joined by fittings all parts of which are substantially contained within the cylinder defined by the outer surface of that tube, and the sections of the outer tube being all electrically and mechanically connected by fittings entirely outside of the cylinder defined by the inner surface of that tube, an insulating tube mechanically and electrically separating said metal tubes, said insulating tube being formed of rigid adjoining sections close fitting and slidable on the inner metal tube and within the outer metal tube for ready field assembly.

4. A bus system for welding and similar inductive loads of high current demand comprising a bare outer metal tubular conductor at ground potential and formed of connected sections, an insulation tube having a close sliding fit within the metal conductor, a second metal tubular conductor having a close sliding fit within the insulation tube also formed in sections, said conductors and tube being preformed and readily telescopically assembled and disassembled, and a fitting connecting adjacent ends of two sections of the inner conductor, said fitting being entirely within the inner circumference of the insulation tube, whereby the tubular conductors and the insulation tube may be telescoped for field assembly.

5. A bus system for welding and similar inductive loads of high current demand comprising inner and outer solid walled, tubular conductors each having a diameter to wall thickness ratio of at least 10, the spacing between the outer surface of the inner conductor and the inner surface of the outer conductor being just sufficient to accommodate the required solid insulation to provide safety at the operating voltage desired, said insulation comprising a self-supporting tube fitting only sufficiently loosely between the conductors for telescoping, whereby the conductors and insulation may be assembled in the field.

6. The bus system as described in claim 5 in which the outer tube is bare, including means to deliver a cooling fluid through and directly in contact with the wall of the inner tube.

7. A bus system for delivering single phase alternating current of low frequency from a power source to a load requiring high current at a low power factor with excellent voltage regulation comprising, in combination, nested, tubular conductors, insulating means separating said conductors and being in the form of a self-supporting tube fitting only sufficiently loosely between the conductors for telescoping therewith, whereby the conductors and insulating means may be assembled in the field, the metal in each of said conductors being of substantially the same cross-sectional area and so disposed as to provide minimum inductive reactance and maximum conductivity at the said frequency.

8. A bus system for delivering single phase alternating current of low frequency from a power source to a load requiring high current at a low power factor with excellent voltage regulation comprising, in combination, nested, tubular conductors, a self-supporting insulating tube forming the sole insulating means between said conductors and fitting only sufficiently loosely between the conductors for telescoping therewith, whereby the conductors and insulating means may be assembled in the field, the metal in each of said conductors being of substantially the same cross-sectional area and so disposed as to provide minimum inductive reactance and maximum conductivity at the said frequency.

LEONARD R. BOGARDUS.